(12) United States Patent
Curtin et al.

(10) Patent No.: US 8,035,892 B2
(45) Date of Patent: Oct. 11, 2011

(54) RELIABLE STARTUP OF HIGH POWER THIN-DISK LASER RESONATORS

(75) Inventors: Mark S. Curtin, Simi Valley, CA (US); John L. Stratton, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 12/416,810

(22) Filed: Apr. 1, 2009

(65) Prior Publication Data
US 2010/0254424 A1    Oct. 7, 2010

(51) Int. Cl.
*H01S 3/082*    (2006.01)
*H01S 3/136*    (2006.01)

(52) U.S. Cl. ....................................................... 359/346
(58) Field of Classification Search .................. 359/333, 359/346; 372/7, 33, 92, 95, 97, 107
See application file for complete search history.

(56) References Cited

U.S. PATENT DOCUMENTS

| | | | |
|---|---|---|---|
| 4,733,400 A | 3/1988 | Thyzel et al. | |
| 4,812,641 A | 3/1989 | Ortiz, Jr. | |
| 5,280,536 A | 1/1994 | Dumond et al. | |
| 5,553,088 A * | 9/1996 | Brauch et al. | 372/34 |
| 6,194,707 B1 | 2/2001 | Yang | |
| 6,339,605 B1 * | 1/2002 | Vetrovec | 372/35 |
| 6,603,793 B2 * | 8/2003 | Vetrovec | 372/95 |
| 6,873,639 B2 * | 3/2005 | Zhang | 372/69 |
| 6,888,872 B2 * | 5/2005 | Vetrovec | 372/95 |
| 6,952,531 B2 | 10/2005 | Aronson et al. | |
| 6,987,789 B2 * | 1/2006 | Bruesselbach et al. | 372/70 |
| 7,058,310 B2 | 6/2006 | Aronson et al. | |
| 7,356,066 B2 * | 4/2008 | Ludewigt et al. | 372/93 |
| 2002/0172253 A1 | 11/2002 | Vetrovec | |
| 2008/0175288 A1 | 7/2008 | Vetrovec | |
| 2008/0304534 A1 | 12/2008 | Sumida et al. | |
| 2009/0268775 A1 | 10/2009 | Holmes | |
| 2010/0027572 A1 | 2/2010 | Widen et al. | |

* cited by examiner

*Primary Examiner* — Mark Hellner
*Assistant Examiner* — Ari M Diacou
(74) *Attorney, Agent, or Firm* — Haynes and Boone, LLP

(57) ABSTRACT

Helper resonators useful for the reliable, controlled startup of an associated high power multidisk unstable imaging thin disk laser (TDL) main resonator each includes one of the thin disk gain elements (TDGEs) of the associated main resonator and a pair of helper reflectors disposed on opposite sides thereof. The helper resonators act to prevent the buildup of undesirable amplified spontaneous emission (ASE) during startup of the main resonator, pre-condition the TDGEs so as to enable efficient power transfer from the helper resonators to the main resonator when the main resonator reaches a selected feedback ratio (FBR) and provide a rapidly acting shunt for disk power in the event of a cessation of lasing of the main resonator.

20 Claims, 4 Drawing Sheets

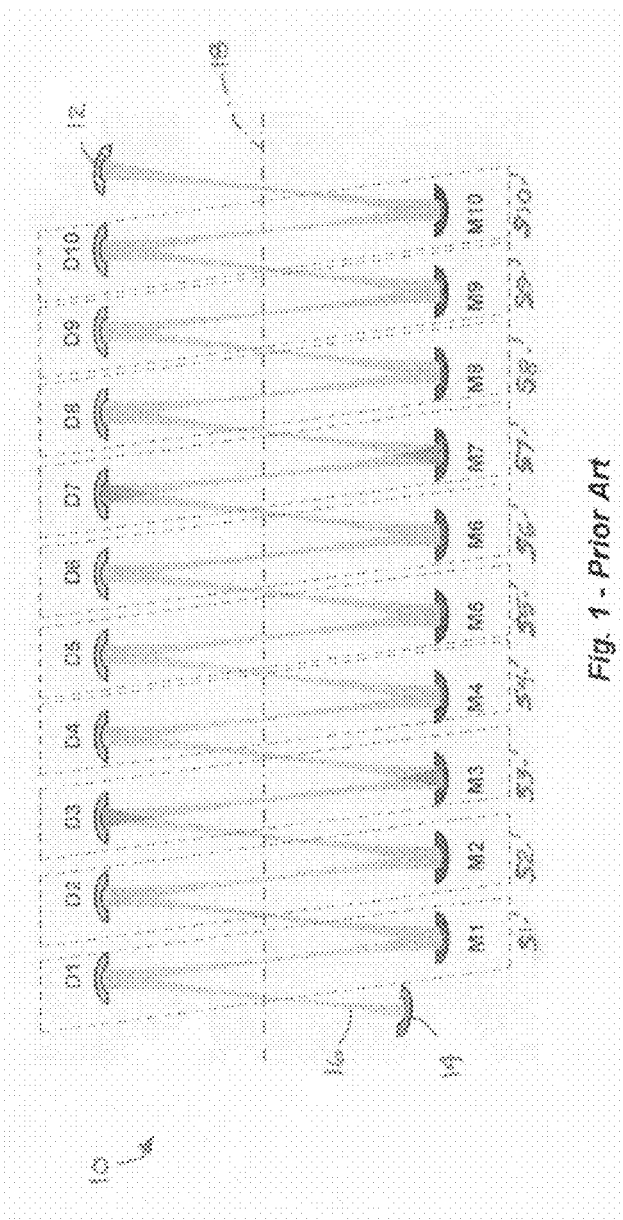
Fig. 1 - Prior Art
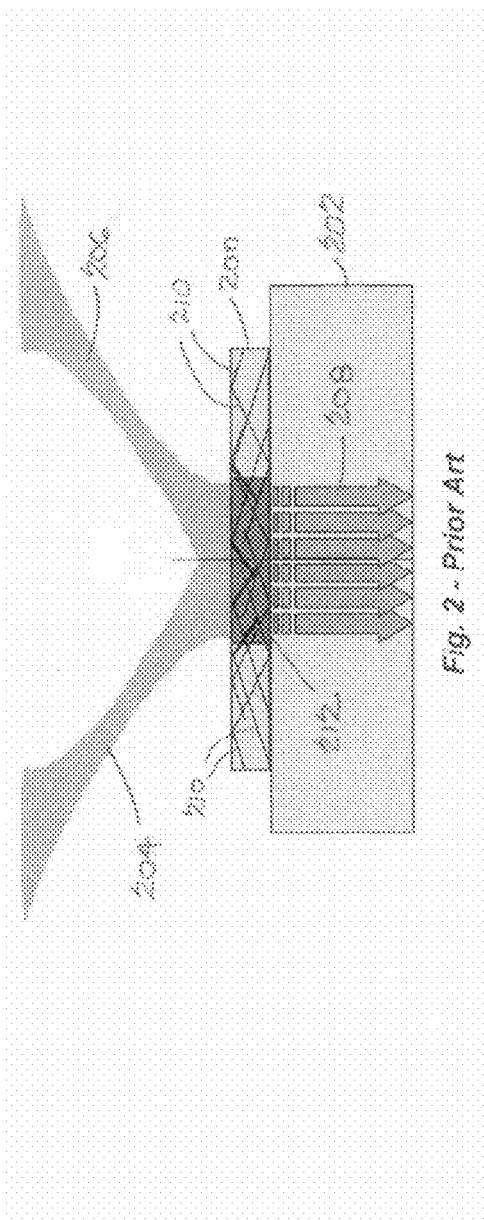
Fig. 2 - Prior Art

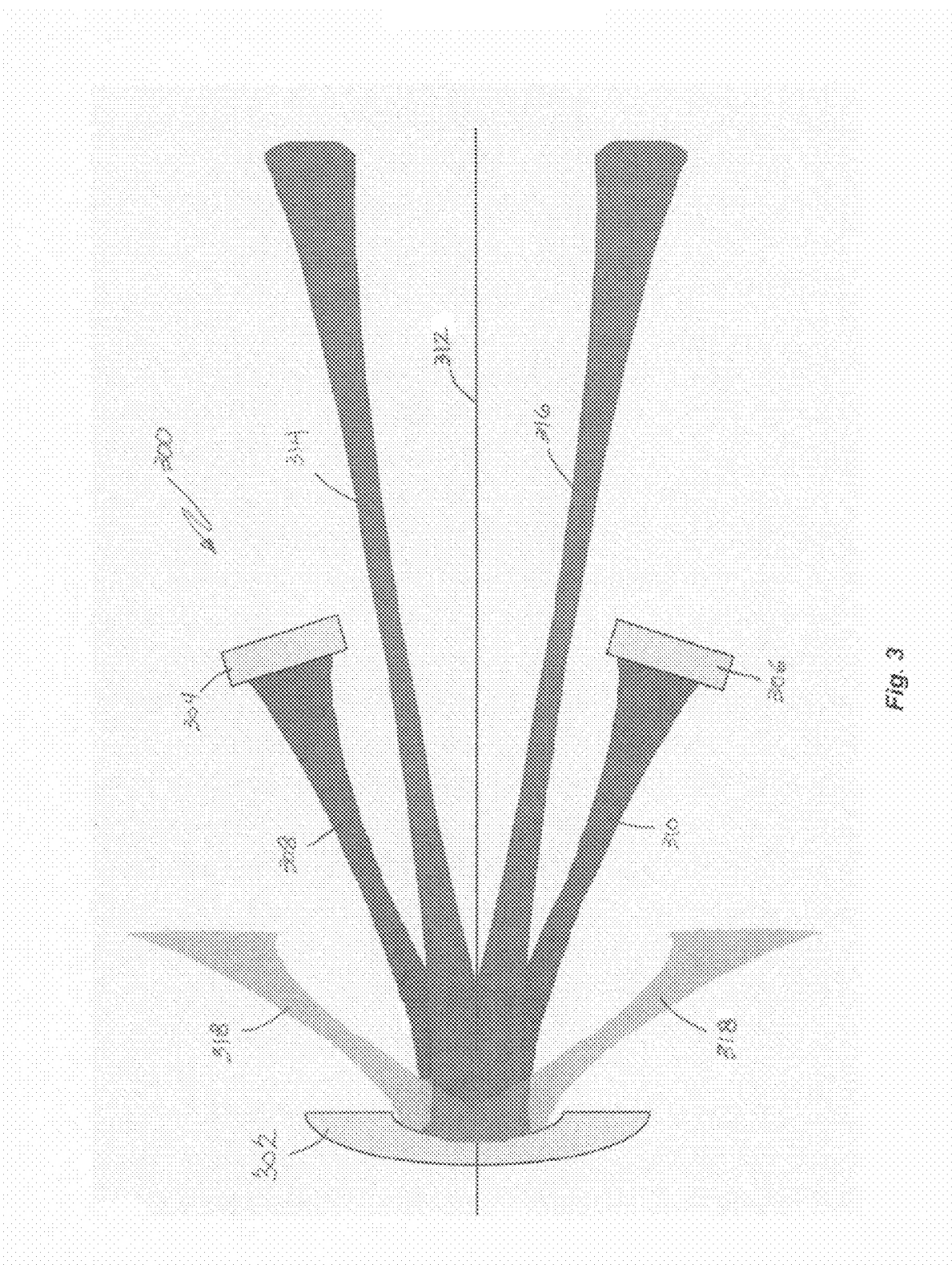

RELIABLE STARTUP OF HIGH POWER THIN-DISK LASER RESONATORS

BACKGROUND

1. Technical Field

The present disclosure relates to high power lasers, in general, and more particularly, to systems for enabling the reliable startup of high power unstable multidisk thin disk laser (TDL) resonators.

2. Related Art

A "Thin Disk Gain Element" (TDGE), sometimes referred to as an "active mirror," is an optical amplifier gain medium, typically but not necessarily disk-shaped, in which stimulated emission of light, i.e., "lasing," is produced when the disk is appropriately illuminated with a pump light source and a seed laser input, resulting in an output seed laser with gain. Conventional TDGEs may be made from a ytterbium (Yb) doped yttrium aluminum garnet (YAG) crystal, i.e., Yb:YAG disks, bonded to heat sinks, such as diamond or copper. In conventional TDGE systems, the crystal of the gain medium is fixed to the heat sink with a layer of, e.g., an indium or equivalent bonding solder or adhesive. The heat sink may be liquid cooled, e.g., with water or cryogenic fluids, or with a thermoelectric (TE) cooler. For clarification purposes, a Thin-Disk Laser (TDL) represents a combination of TDGEs, a highly reflective (HR) Primary mirror, a partially reflective feedback mirror commonly referred to as an Out-Coupler (OC) and a multitude of fold mirrors (FM) that properly image and link the intra-cavity optical beam to the multiple TDGEs. Power scalable TDLs are described in detail in, e.g., U.S. Pat. Pub. No. 2008/0304534 A1 by D. Sumida et al.

One approach to achieving a solid state laser with relatively high average output power is to employ a module-scaling approach in which multiple Gain Elements (GEs) are combined within a common resonator, enabling a single-output-beam laser at power levels well beyond the capability of a laser built around a single GE. For example, welding lasers employing Yb:YAG TDGEs have demonstrated significant output power levels with outstanding optical-optical efficiency by employing resonators designed to operate in the stable regime. However these high-power welding-laser designs do not achieve near-diffraction-limited output laser beams due to the significant multi-mode content within the output laser beam. Achieving a near-diffraction-limited output laser beam requires a resonator design that achieves single transverse mode operation within the laser. Multiple-TDL laser resonator systems are described in more detail in, e.g., U.S. Pat. No. 6,987,789 to H. Brusselbach et al. and in U.S. patent application Ser. No. 12/109,634 by D. Holmes, filed Apr. 25, 2008.

Applications requiring the generation of small laser spot size at large working distances require near-diffraction-limited laser beams. The typical performance measure that characterizes a laser beam with good focusability is the beam quality factor (BQ), where a diffraction-limited beam has a BQ=1 and a BQ>1 for beams with less focusability. Military applications typically require both high power and good BQ while preserving outstanding optical-to-optical efficiencies, making these applications the most demanding. Utilization of a Negative-Branch-Imaging-Resonator (NBIR) design with a Gradient Reflectivity Mirror (GRM) Out-Coupler (OC) theoretically would enable single-transverse mode operation within the resonator. This resonator design can theoretically achieve high power through multi-module scaling and resonator fold mirrors that image TDGE to TDGE within the resonator.

However, as a practical matter, TDLs designed to achieve such objectives are complicated by temperature-dependent aberrations within the TDGEs which arise from two primary sources associated with a variation in stored energy across the pumped region of the TDGE and Amplified Spontaneous Emission (ASE) trapped within the TDGE. In addition to causing optical aberration within the TDGEs, these effects can, if not properly controlled, lead to degradation of the TDGEs via intensity-dependent effects that give rise to temperature and stress-induced degradation. These effects become more prominent with increased pump diameter and increased pump intensity, which represent the standard strategies for storing more energy within each TDGE. These effects are particularly troublesome during the start-up of the TDL, due to the dynamic nature of these effects. The dynamic effects manifest as both temporally and spatially changing aberration distributions within each TDGE, making mode-control within the resonator challenging.

The design of resonator architectures is also compromised by large variations of energy extraction within the TDLs during the start-up of the resonators. These large variations in extracted energy from the TDLs during startup act to cause disk temperature variations that lead to non-tractable disk aberrations and loss of mode control, and ultimately, prevent the resonator from establishing the desired fundamental GRM mode, and can potentially result in degradation of the TDLs due to ASE-induced damage mechanisms.

The realization of high-power multidisk TDLs with near-diffraction limited beam quality and high optical-to-optical efficiency is thus predicated on establishing and maintaining single transverse mode operation within the resonator in the presence of highly dynamic aberrations arising within the TDGEs.

A need therefore exists for methods and apparatus that enable the reliable startup of a TDL designed to produce a near-diffraction-limited output beam in the presence of dynamically changing aberrations within the TDGEs of the resonator.

SUMMARY

This disclosure describes methods and apparatus that significantly mitigate the problematic aberrations within the TDGEs of a multidisc TDL resonator, thereby enabling single transverse mode operation in the resonator, and which also mitigate the growth of ASE trapped within the TDGEs, thereby significantly reducing the probability of ASE-induced degradation and loss of mode control within the resonator.

In accordance with the present disclosure, multi-mode (stable) resonators, or "helper resonators," are provided for each TDGE of an unstable single-mode multidisk TDL main resonator that run "parasitically" with the main resonator. The helper resonators provide stable uniform energy extraction across each TDGE pump area during the start-up of the associated TDL main resonator, thereby pre-conditioning the disks to have minimal aberration content and a predictable curvature change during startup. The helper resonators establish the disk figure conditions necessary for the main resonator to establish the fundamental GRM mode and thereby prevail in the competition for disk gain against the helper resonators. The helper resonators also provide a fast-acting shunt for stored energy within the TDGEs offering protection of the TDGEs should an intra-cavity optic within the main resonator degrade.

In one example embodiment, a helper resonator useful for the reliable, controlled startup of an associated high power multidisk unstable imaging TDL main resonator comprises a thin disk gain element TDGE of an associated multidisk unstable imaging TDL main resonator, the TDGE having an axis extending through a center of and normal to a front surface thereof, and a pair of helper reflectors disposed on opposite sides of the TDGE, including a partially reflective out-coupler optic and a high-reflectivity reflector respectively disposed on optical axes that are coplanar with each other and the normal axis of the TDGE, and that intersect the normal axis of the TDGE at the front surface thereof at equal angles.

In another embodiment, a multidisk unstable imaging TDL main resonator comprises a plurality of laser disk imaging devices each comprising a respective one of a plurality of TDGEs disposed in confocal relationship with an associated one of a plurality of corresponding spherical concave relay mirrors, the imaging systems being disposed in cascade along a W- or zigzag-shaped optical axis of the main resonator, a spherical concave primary mirror disposed at a first end of the optical axis of the main resonator, a spherical concave feed-back mirror disposed at an opposite second end of the optical axis of the resonator, a plurality of laser light sources for pumping each of the TDGEs with laser light, and a plurality of helper resonators respectively associated with each of the TDGEs of the main resonator.

A better understanding of the above and many other features and advantages of the multi TDL resonator startup systems of the present disclosure may be obtained from a consideration of the detailed description of some example embodiments thereof below, particularly if such consideration is made in conjunction with the appended drawings, wherein like reference numerals are used to identify like elements illustrated in one or more of the respective figures thereof.

BRIEF DESCRIPTION OF THE DRAWINGS

FIG. 1 is a schematic illustration of a thin disk laser (TDL) in accordance with the prior art, comprising a multidisk negative-branch imaging resonator (NBIR) configured to operate as an unstable resonator when the TDGEs reach a desired curvature;

FIG. 2 is a side elevation view of a conventional TDGE during lasing, showing the occurrence of Amplified Spontaneous Emission (ASE) therein;

FIG. 3 is a side elevation view of an example embodiment of a helper resonator in accordance with the present disclosure;

DETAILED DESCRIPTION

Figures 4A, 4B, 4C, 4D:
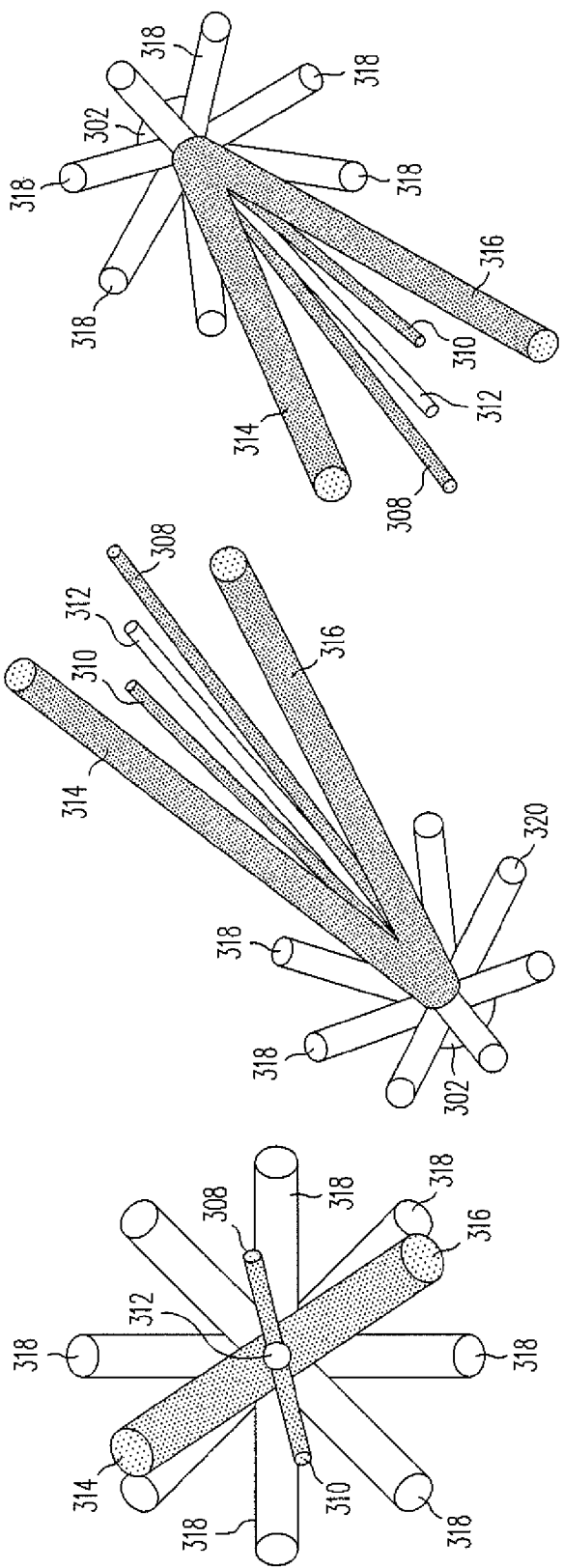
FIGS. 4A-4D are a partial front elevation view, opposite front and side perspective views, and a side elevation view, respectively, of the intersection of helper resonator light beams, main resonator light beams, and pump light beams with a normal axis at the center of a front surface of the TDGE of the example helper resonator of FIG. 3; and, FIG. 5 is schematic illustration of an example embodiment of a multidisk NBIR incorporating a plurality of helper resonators, one per TDGE, in accordance with the present invention.

In accordance with the present disclosure, methods and apparatus are provided for mitigating the degrading effects associated with problematic aberrations arising within the TDGEs of a multidisk unstable imaging TDL main resonator due to non-uniform extraction across the active regions of the TDGEs and thereby enabling the NBIR to reach the configuration necessary to achieve single transverse mode operation, and specifically, the fundamental GRM mode of the resonator. As used herein, "problematic aberrations" are defined as aberrations which cannot be corrected by a static axisymmetric phase corrector placed within the NBIR at a TDGE image location. In addition, the novel method and apparatus limit the growth of ASE trapped within the TDGE, thereby reducing the probability of ASE-induced degradation of the TDGEs and enabling higher pump power levels to be achieved.

FIG. 1 is a schematic illustration of a multidisc negative branch imaging resonator (NBIR) configured to operate in the unstable regime when proper TDGE curvatures are achieved, thereby forming a multidisk unstable imaging TDL main resonator 10 of a type described in detail in U.S. patent application Ser. No. 12/109,634 by D. Holmes, filed Apr. 25, 2008. The resonator 10 includes a spherical concave "primary" mirror 12 and a spherical concave "secondary" or "feed-back" mirror 14 that are respectively positioned at opposite ends of a plurality of one-to-one (1:1) laser disk imaging devices S1-S10, each shown enclosed in a rectangular dashed line outline, with the primary mirror 12 being disposed adjacent to the last imaging system S10 and the feedback mirror 14 being disposed adjacent to the first imaging system S1. In the embodiment illustrated in FIG. 1, the laser pump sources used to pump the TDGEs D1-D10 of the resonator 10, which may comprise conventional laser diodes, are omitted for clarity of illustration. Additionally, it should be understood that the feedback mirror 14, or "output coupler" (OC) mirror, may comprise a gradient reflectivity mirror (GRM) of a known type.

Each of the imaging systems S1-S10 comprises one of a plurality of TDGEs D1-D10 disposed in confocal relationship with an associated one of a plurality of spherical concave reflecting, or "relay" mirrors M1-M10. The imaging systems S1-S10 themselves are disposed in cascade along a W- or zigzag-shaped main optical axis 16 of the resonator 10, such that the output laser signal from one imaging system serves as the input signal to the next succeeding imaging system. This occurs in both a "forward path" propagation direction, i.e., from the primary mirror 12 to the feedback mirror 14, as well as in a "feedback path" propagation direction, i.e., from the feedback mirror 14 to the primary mirror 12. An axis of symmetry 18, shown by a phantom line, runs through the loci of the respective focal points of the confocal 1:1 imaging devices S1-S10.

The TDGEs D1-D10 and the relay mirrors M1-M10 of the imaging devices S1-S10 of the resonator 10 are also positioned in a mutually oblique relationship in an array pattern known as a "W configuration." The confocal relationship of the TDGEs D1-D10 and relay mirrors M1-M10, together with the W configuration array, provides for full self-imaging of each TDGE light output signal onto each adjoining TDGE within the NBIR 10, thereby achieving a much higher total laser power output from the resonator 10 than that which is achievable from a single TDGE device.

However, this particular NBIR 10 configuration presupposes a given curvature/profile on each of the TDGEs D1-D10 in order to reach the desired imaging condition and resonator operating point required to lase in the fundamental GRM mode. The method and apparatus of the present disclosure bring the TDGEs to the shape/condition required for the NBIR to lase in the fundamental GRM mode in a stable and controlled manner. During the laser startup process, the pump power is transitioned from low to high power, resulting in increased stored energy within the active region of each TDGE. Depletion of the TDGE stored energy occurs primarily through three different channels (in the absence of the helper resonators described herein), specifically, 1) the NBIR lasing mechanism itself, 2) the ASE mechanism and 3) the heat generation mechanism. The ASE mechanism can result in both ASE that is trapped within a TDGE and that which escapes the TDGE. The ASE trapped within the TDGE is the component which it is desired to minimize, since its growth acts to effectively compete for gain against the NBIR 10, and thus, to degrade optical-to-optical efficiency. The ASE trapped within the TDGE can also have significant growth, leading to extremely high intensities within the TDGE and resulting in intensity-induced degradation mechanisms of the TDGE.

Further, ASE trapped within a TDGE creates an additional heat source within the TDGE that adds to other heat-generating mechanisms, and eventually, can overwhelm the heat removal capability of the system and result in a rapid temperature rise within the active region of the TDGE. The temperature increase occurs predominantly in the active region of the TDGE, leading to both temperature-dependent optical aberrations and temperature-gradient-dependent optical aberrations within the TDGE. The temperature-dependent optical aberrations manifest predominately as axisymmetric aberrations arising due to an expanding TDGE active region constrained by the colder outer portion of the TDGE rigidly affixed to the heat spreader. The temperature-gradient-dependent optical aberrations manifest in a diversity of Zernike coefficients and thus prove highly problematic in achieving a sufficiently low round-trip wavefront error (RTWFE) necessary for fundamental GRM mode operation within the host NBIR.

Another important consideration in the design of a high-power TDL resonator system is the need to effectively increase the stored energy in each TDGE, thereby enabling the designer to achieve similar TDL output power levels with fewer TDGEs and thus reducing the size and weight associated with each TDGE subsystem. Since the TDGE geometry utilizes the heat removal features of the thin disc, the strategy commonly used is to increase the pump area while maintaining constant pump intensity, or to increase the pump intensity while maintaining constant pump area. Both approaches offer increased stored energy within the TDGEs. However, each approach stresses a different limitation of the TDGE design. Increasing the pump area at constant pump intensity results in significantly greater ASE growth, whereas, higher pump intensity at fixed pump area generates higher TDGE surface temperatures and associated higher optical aberration content.

A significant limitation associated with increasing single disk output power through pump-area scaling is driven by amplified spontaneous emission (ASE) in the plane of the TDGEs D1-D10 of the host TDL. FIG. 2 is a side elevation view of a single TDGE 200 having a rear surface mounted on a heat sink 202 and being illuminated with a beam of pump light 204 from a pump laser light source (not illustrated) to produce a reflected and amplified beam of laser light 206. The heat 208 produced by the lasing process in the TDGE 200 is carried away from the rear surface of the disk by the heat sink 202. However, as illustrated in FIG. 2, during ASE, a portion of the ASE light rays 210 that are produced are generated in directions other than along those of the incident and emitted light beams 204 and 206, for example, in a lateral direction, i.e., a direction parallel to the plane of the disk, and results in trapping of some of the ASE energy 210 within the disk 200. The ASE growth mechanism then competes for the stored energy within the TDGE 200, thereby limiting the available energy to be captured by the TDL beam 204, 206 and severely impacting the optical-to-optical efficiency of the host TDL.

ASE growth in the lateral dimension of the TDGE 200 thus limits the maximum achievable single-disk power level. The ASE effect is significant due to the TDGE 200 geometry, characterized by a large diameter-to-thickness ratio. Increasing the diameter of the optical pump effectively increases the lateral gain length within the TDGE 200, thereby enabling ASE growth and leading to gain depletion within the TDGE 200. It is therefore not possible to maintain the diameter-to-thickness ratio as the pump diameter is increased, because the disk thickness is limited by the maximum allowable surface temperature of the disk. Moreover, the growth of ASE within the disk not only depletes the gain, it also leads to heating of the TDGE 200 beyond the ability of the heat sink 202 to remove the heat thereby generated, ultimately resulting in the degradation of the TDGE 200.

For multi-disk unstable main resonators that do not support a large number of optical modes, the ASE growth in the lateral dimension of the TDGEs is complicated by a spatially non-uniform energy extraction, giving rise to a computationally challenging effective lateral gain length within each TGDE. In addition, the spatially non-uniform extraction induces significant disk-specific thermal gradients leading to disk-specific aberrations. These aberrations act to alter the mode(s) running within the main resonator and lead to both temporally and spatially non-uniform energy extraction across the pumped regions of the TDGEs of the resonator.

Commercial welding lasers that employ Yb:YAG TDLs limit the lateral ASE build up by increasing the output coupler reflectivity to a level that enables the multi-mode resonator to effectively compete for the available gain within the disk. The multi-mode resonator has the added advantage of supporting a sufficient number of optical modes so as to uniformly extract energy from the pumped region. Uniform energy extraction suppresses temperature gradient variations and the associated wavefront aberrations generated by such temperature gradients.

It has been discovered that the incorporation of individual "helper resonators" of a type described in more detail below in association with each of the TDGEs of a NBIR provides an additional channel for depletion of the TDGE stored energy. The design of the helper resonators is optimized to effectively compete with the ASE generation mechanism, thereby limiting the magnitude of the ASE trapped within the TDGEs at a given pump power level. In addition, the helper resonators are designed to operate highly "multi-moded," thereby providing effective competition against the NBIR until the desired pump-power-dependent optical aberrations are minimized, enabling the NBIR to achieve fundamental GRM mode operation characterized by a highly uniform super-Gaussian intensity distribution across the active region of each TDGE. The ability of the helper resonators to dominate in the competition for gain against the NBIR is crucial, since the NBIR will not lase in a transverse mode that presents a uniform intensity across the active region of the TDGE, thus introducing a non-uniform extraction and a subsequent non-uniform optical aberration and leading to a transverse mode hop initiating a new cycle. The helper resonators are designed to dominate in the competition for gain from the TDGEs against the NBIR as the pump power ramps up to its final power level, at which point, the residual round trip wavefront error within the NBIR is such as to make the NBIR more competitive against the plurality of helper resonators and the NBIR lases strongly in the fundamental GRM mode. The plurality of helper resonators acts to extract energy from the TDGEs in a complementary spatial distribution as that of the non-fundamental-GRM-mode lasing within the NBIR. Thus, the combination of helper lasing and NBIR lasing presents a nearly uniform extraction distribution across the TDGE active region, limiting the residual round trip wavefront error and enabling the NBIR to achieve fundamental GRM mode operation at the design pump power point. The residual axisymmetric optical aberrations present in the NBIR/helper configuration are minimized with an intra-cavity phase corrector that is designed to compensate for these aberrations when the pump power reaches the desired power level.

Thus, as described in more detail below, the present disclosure contemplates the incorporation of a set of resonators (viz., one per TDGE), referred to herein as "helper resonators," configured to enable a large number of modes to lase within the resonator and to run concurrently with the multidisc NBIR. The helper resonators act to deplete the stored energy within the active region of each TDGE as the pump power is increased to the design power level, during which time the NBIR is incapable of lasing strongly due to aberration effects. In providing an alternative channel for energy to be extracted from the TDGEs, the competing ASE channel is effectively starved, thereby limiting the growth of lateral ASE within each of the TDGEs of the main TDL resonator.

The multi-mode helper resonators further act to suppress non-uniform energy extraction from each TDGE during startup of the main resonator. The helper resonators designed to support a large number of potential modes act to effectively extract the spatial complement of the main resonator's extraction profile across each TDGE. This feature, in effect, favorably "pre-conditions" the TDGEs of the main resonator during startup, enabling efficient power transfer from the helper resonators to the main resonator once the pump power level is achieved corresponding to the designed axisymmetric phase corrector. The helper resonators thus function, first, to effectively limit the gain-depleting effects of ASE in the lateral dimension of the associated TDGE, second, to pre-condition the TDGEs to enable efficient power transfer from the helper resonators to the main resonator once the main resonator reaches its design feedback ratio (FBR), and third, to provide a fast transfer of TDGE power to the helper resonators should the main resonator cease lasing for any reason.

An example embodiment of a single-disk helper resonator 300 in accordance with the present disclosure is illustrated in the side elevation view of FIG. 3. In FIG. 3, the helper resonator 300 comprises a single TDGE 302, which, as discussed below, comprises an associated one of the plurality of TDGEs of a multidisk main resonator (see FIG. 5) of which it is a part, and a pair of helper reflectors disposed on opposite sides of the TDL 302, viz., a partially reflective "secondary" outcoupler optic 304 and a high-reflectivity "primary" reflector 306, configured in a V-resonator layout.

As illustrated in FIG. 3, the example TDGE 302 has a normal axis 312 that extends through a center of the TDGE and is disposed normal to a front surface thereof. The helper resonator light beams 308 and 310 travel along respective optical axes of the helper reflectors 304 and 306, which respectively extend between the TDGE 302 and the helper reflectors 304 and 306. These axes are coplanar with each other and the normal axis 312 of the TDGE 302, and intersect the normal axis 312 at the front surface of the TDGE at equal angles. The respective axes of the main resonator light beams 314 and 316 extending between the TDGE 302 and the adjacent relay mirrors (not seen in FIG. 3) of the main host resonator are also coplanar with each other and the normal axis 312 of the TDGE 302, and are also disposed at equal angles relative thereto, as in the conventional NBIR laser disk resonator 10 of FIG. 1 described above. Similarly, the pump light beams 318 radiating from pump light sources (not illustrated) input to the front surface of the TDGE 302 to pump it are disposed at equal angles relative to the normal axis 312 of the TDGE 302.

The respective optical axes of the helper resonator 300 light beams 308 and 310, the main resonator light beams 314 and 316, and the pump light beams 318 all intersect each other and the normal axis 312 at the center of the front surface of the TDGE 302, but with their respective common planes disposed at different angles relative to each other, as illustrated in FIGS. 4A-4D, wherein FIG. 4A is a partial front elevation view, FIGS. 4B and 4C are opposite front and side perspective views, and FIG. 4D is a side elevation view of that intersection, respectively.

Of importance, unlike the main resonator 10 of FIG. 1 above, the TDGE 302 and the associated helper reflectors 304 and 306 of the helper resonator 300 are not confocal. Instead, the helper resonator 300 is designed to operate as a stable resonator, i.e., the primary and outcoupler mirrors 306 and 304 are flat or nearly flat and the separation between the three elements of the "helper" resonator are designed to ensure operation in the stable regime, enabling many modes to be supported within the helper resonator 300. The separation of the three elements of the "helper" resonator is optimized to effectively enable a mode to form within the "helper" resonator that can extract energy from the TDGE over much smaller dimensions than the full pump area. This feature is critical to enabling the "helper" resonator to extract the spatial complement to that of the main resonator in each of the TDGEs during that portion of the startup where significant power sharing occurs between the main resonator and the plurality of "helper" resonators. However, the TGDE 302 used to power the helper resonator 300 is the same as that used in the main resonator 10, so that the pumped area of the TGDE 302 roughly defines the mode envelope in the helper resonator 300. The mode envelope size at the highly reflective and outcoupler mirrors 306 and 304 in the helper resonator 300 is thus relatively small compared to the mode envelope size at the TGDE 302 itself.

With reference to FIG. 3, the helper resonator 300 is designed to operate in the stable-resonator regime so as to support an extremely large number of modes within the helper resonator 300. The laser beam that is outcoupled from the out-coupler optic 304 of each helper resonator 300 may be transported to a diagnostics unit 502 (FIG. 5) that provides information on the performance, health and reliability of the associated TGDE 302.

Figure 5:
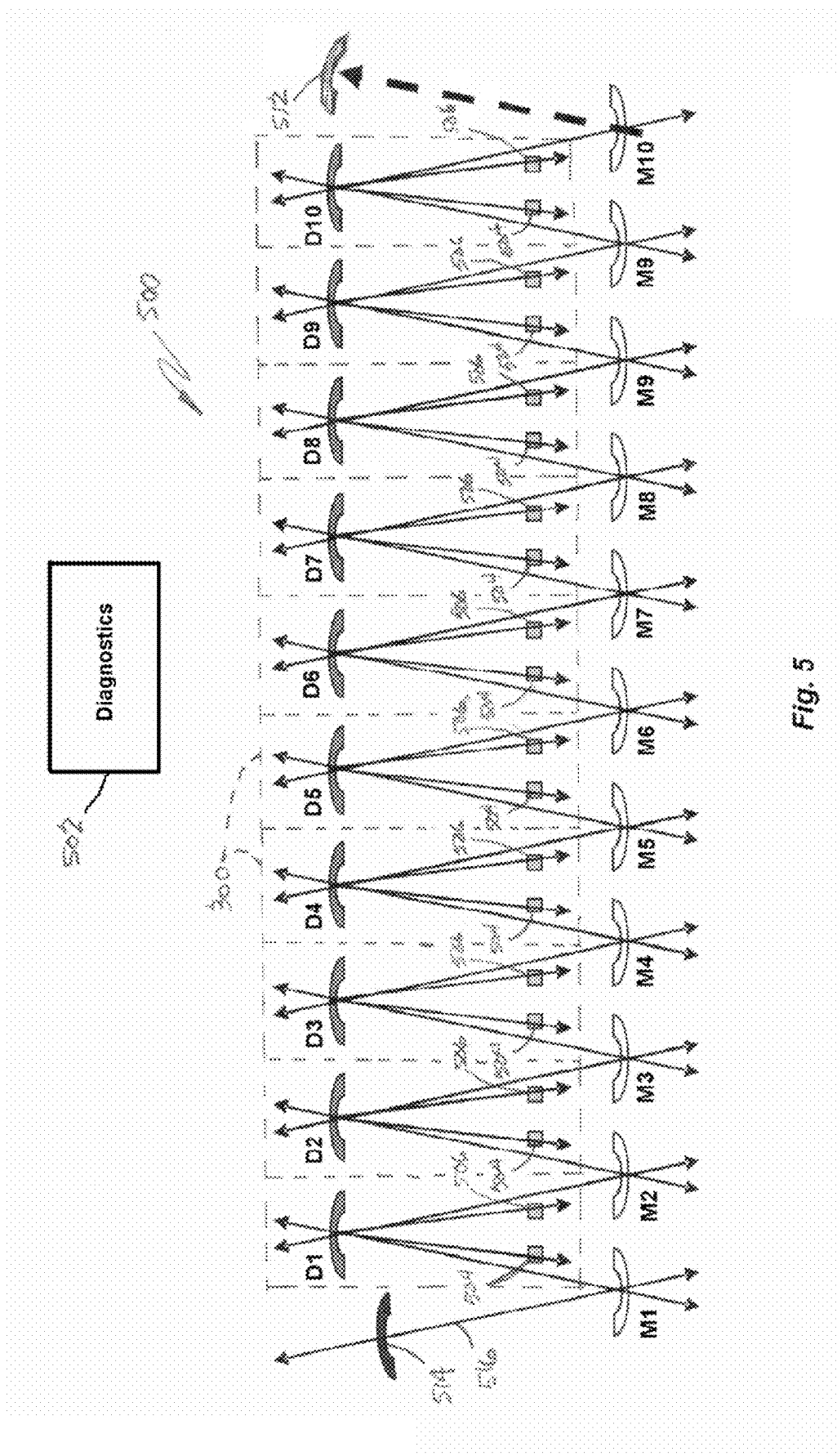

As illustrated in FIG. 5, in one possible embodiment, the diagnostics unit 502 may comprises a plurality of optical sensors optically coupled to the output optic 304 of each helper resonator 300 and operable to measure the laser power pumped into each TGDE D1-D10, the laser power output from each of the helper resonators 300, and the laser output power output from the main host resonator 500. Conventional wavefront sensors, temperature sensors and flow sensors (not illustrated) may also be used to provide health monitoring data on the main resonator 500, and the diagnostics unit 502 may include a data acquisition module operable to convert analog outputs of the sensors into digital signals compatible with storage in a computer of the laser diagnostic system. The diagnostics unit 502 may include a database for storing the state of each TGDE 302 under varying optical pump absorption conditions, main resonator 500 lasing conditions and helper resonator 300 lasing conditions, and an analysis and display system may be included for providing an operator of the main resonator 500 with performance metrics on the power balance condition within each TGDE D1-D10.

As discussed above, the structure of the helper resonator 300 is designed to support a large number of modes and to produce an intensity distribution within the associated TGDE 302 that is of sufficient magnitude to effectively compete for available disk gain against the lateral ASE effect therein. The magnitude of the intensity distribution within the associated TGDE 302 is chosen by the outcoupler 304 reflectivity, which dominates the loss within the helper resonator 300. The number of modes supported by the helper resonator 300 is influenced by the intra-cavity optical element curvatures and spacing, which is chosen to ensure highly multi-mode operation over the full range of TGDE 302 disk curvatures generated as the intensity of the pump light 318 increases from a low to a high power level. As the intensity of the pump light 318 increases, population inversion occurs within the TGDE 302 laser medium, and energy is stored within the disk, as discussed above. Multiple effects deplete this stored energy, which is then quickly replaced by new pump light 318 photons.

FIG. 5 is schematic illustration of an example embodiment of a multidisk NBIR TDL resonator 500 incorporating a plurality of the helper resonators 300 of FIG. 3. Like the conventional NBIR resonator 10 of FIG. 1, the novel resonator 500 incorporates a spherical concave primary mirror 512 which may also incorporate a phase-correcting figure to minimize residual wavefront aberration and a spherical concave secondary or feedback mirror 514 that are respectively positioned at opposite ends of a plurality of 1:1 laser disk imaging devices, each comprising a respective one of a plurality of TGDEs D1-D10 disposed in confocal relationship with an associated one of a plurality of corresponding relay mirrors M1-M10. The disk imaging systems are disposed in cascade along a W- or zigzag-shaped optical axis 516 of the resonator 500. As in the resonator 10, the laser light pump sources are omitted for simplicity of illustration, and as discussed above, the secondary or feedback mirror 514 of the resonator 500 may comprise a known type of GRM used for coupling out a portion of the main beam of the resonator 500 as a laser light output signal.

As described above in connection with FIG. 3, the helper resonators 300 each includes a pair of helper reflectors 504, 506 respectively associated with each of the TGDEs D1-D10, each pair comprising a partially reflective out-coupler optics 504 and a high-reflectivity helper reflector 506. As described above, a diagnostics unit 502 may be used to provide information on the performance, health and reliability of the associated TGDEs D1-D10, as well as on those of the main resonator 500 itself.

The helper resonators 300 are arranged to competitively deplete available disk gain within the main TDL resonator 500 during the startup of the latter, thereby delaying the onset of significant ASE growth and its many undesirable effects, until higher pump intensities are reached. As the pump light intensity increases and the helper resonators 300 begin to extract energy from their associated TGDEs D1-D10, the energy available to the lateral ASE channel of each TGDE is temporarily diminished. The multi-mode helper resonators 300 extract energy from the TGDEs D1-D10 in a spatially uniform manner, thereby substantially limiting the pump-intensity-dependent aberrations within the TGDEs D1-D10 primarily to focus and primary spherical Zernike components.

Startup of the main resonator 500 begins with a linear increase in pump power incident on each of the TGDEs D1-D10, resulting in each TDGE storing energy in the form of atomic upper state distributions within the TDGE and a concomitant increase in the respective surface temperatures thereof. The increasing surface temperature of each TGDE is uniform across the respective pump region thereof, giving rise to an increase in the disk radius of curvature in the pumped region. Since the pump light does not fully illuminate the respective TDGEs D1-D10, the colder outer annuli of each TDGE generates hoop stresses on the respective hot expanding inner cores thereof, causing the material to pucker and giving rise to the primary spherical aberration seen in the TDGEs D1-D10 at higher pump intensities. However, the change in TDGE radius of curvature (ROC) under the action of the helper resonators 300 and the increasing pump-intensity is predictable and acts to increase the main resonator feedback ratio (FBR) as a function of the delivered pump intensity. The FBR of the main resonator 500 is designed to competitively extract gain from the TDGEs D1-D10 at a specific pump-intensity level, thereby effectively transferring power from the plurality of helper resonators 300 to the main resonator 500. The amount of beam energy extracted from the TDGEs D1-D10 by the main resonator 500 increases approximately in proportion to the decrease in the amount of beam energy extracted from the TDGEs by the helper resonators 300.

It is known that the pump-intensity-dependent primary spherical aberration of the main resonator 500 may be compensated for by the use of an intra-cavity phase corrector which is typically incorporated in the TDGE image plane. The helper resonators 300 act to limit other pump-intensity-dependent aberrations that would result in higher-order intra-cavity aberrations and prevent the main resonator 500 from operating in the fundamental GRM mode.

The incorporation of the helper resonators 300 within the main resonator 500 thus acts both to pre-condition the TDGEs D1-D10 during startup, thereby enabling the necessary conditions to be established for the main resonator 500 to lase efficiently in the fundamental GRM mode, and to provide for reliable operation of the TDGEs D1-D10 in the event of an intra-cavity optic failure within the main resonator 500. Thus, an advantageous method embodiment of the present invention comprises incorporating a plurality of the helper resonators 300 (each operating in the stable regime) in association with each TDGE D1-D10 of a main resonator 500, as illustrated in FIG. 5, such that the helper resonators 300 operate in competition with the main multi-disk resonator 500.

As discussed above, each helper resonator 300 is designed to support a large number of modes, thereby providing a highly uniform energy extraction across the pump area of the associated TGDE. The helper resonators 300 are designed to operate in this fashion over a large range of pump intensities, thereby ensuring that the gain of the associated TGDEs is clamped and the disk figure is predictable. The helper resonators 300 enable a controlled disk figure to be maintained on each associated TGDE as pump power is ramped up toward maximum power.

As may be noted in the TDL resonator embodiment 500 of FIG. 5, all of the TDGEs D1-D10 are common to both the main high-power resonator 500 and the helper resonators 300, so that each TGDE can donate energy to either the main high-power resonator 500 or to its associated helper resonator 300. The appropriate choice of helper resonator 300 FBR compared to the pump-current-dependent FBR of the main resonator 500 influences the current at which transition from predominantly helper resonator 300 lasing to predominantly main resonator 500 lasing occurs. The FBR of the main resonator 500 increases with increasing pump current until the main resonator 500 prevails in extracting energy from the TDGEs D1-D10. The individual helper resonators 300 also act to mitigate disk aberration that would prove detrimental to establishing the fundamental GRM mode within the high-power resonator 500. Optimized operation of the high-power resonator 500 depends on establishing a uniform intensity distribution across the pump area in the disk plane of the TGDEs D1-D10, which is achieved by lasing in the fundamental mode of the high-power resonator 500.

The helper resonators 300 of the present disclosure thus enable a multi-disk unstable TDL main resonator 500 to lase in the fundamental mode while protecting the TGDEs D1-D10 from ASE-induced degradation as the system transitions from low power to high power during startup of the main resonator 500.

Those of skill in this art will appreciate that many modifications, substitutions and variations can be made in and to the materials, apparatus, and configurations of the multidisk TDL resonators with helper resonators of the of the present disclosure without departing from its spirit and scope. Accordingly, the scope of the present disclosure should not be limited to that of the particular embodiments illustrated and described herein, as they are merely by way of some examples thereof, but instead, should be fully commensurate with that of the claims appended hereafter and their functional equivalents.

What is claimed is:

1. A helper resonator, comprising:
   a thin disk gain element (TDGE) of an associated multidisk unstable imaging thin disk laser (TDL) main resonator, the TDGE having an axis extending through a center of and normal to a front surface thereof; and,
   a pair of helper reflectors disposed on opposite sides of the TDGE, including a partially reflective out-coupler optic and a high-reflectivity reflector respectively disposed on optical axes that are coplanar with each other and the normal axis of the TDGE, and that intersect the normal axis of the TDGE at the front surface thereof at equal angles.

2. The helper resonator of claim 1, further comprising a pump light source for energizing the TDGE.

3. The helper resonator of claim 2, wherein the pump light source comprises laser diodes.

4. The helper resonator of claim 1, further comprising means for removing heat from the TDGE.

5. The helper resonator of claim 1, wherein at least one of
   the TDGE comprises an ytterbium (Yb) doped yttrium aluminum garnet (YAG) gain medium,
   the helper resonator is capable of lasing in a large number of modes, and
   the associated multidisk unstable imaging TDL main resonator comprises a negative branch unstable imaging resonator (NBIR).

6. The helper resonator of claim 1, wherein a reflective surface of each of the helper reflectors is flat or nearly flat.

7. The helper resonator of claim 1, further comprising a diagnostics unit coupled to an optical output of the out-coupler optic and adapted to provide information on at least one of the performance, health and reliability of the TDGE.

8. A method for starting up a multidisk unstable imaging thin disk laser (TDL) main resonator incorporating a plurality of thin disk gain elements (TDGEs) reliably and controllably, the method comprising:
   providing a helper resonator in association with each TDGE of the main resonator so as to define a plurality of helper resonators in competition with the main resonator, each helper resonator including:
      an associated one of the TDGEs of the multidisk unstable imaging main resonator, the TDGE having an axis that extends through a center of and is disposed normal to a front surface thereof; and,
      a pair of helper reflectors disposed on opposite sides of the TDGE, including a partially reflective out-coupler optic and a high-reflectivity reflector respectively disposed on optical axes that are coplanar with each other and the normal axis of the TDGE, and that intersect the normal axis of the TDGE at the front surface thereof at equal angles;
   pumping the respective front surfaces of each of the TDGEs with pump light such that each helper resonator operates substantially in a multi-mode regime at a relatively large intra-cavity beam intensity and the main resonator operates substantially in a fundamental mode regime at a relatively small intra-cavity beam intensity at low pump intensity levels; and,
   increasing the intensity of the pump light to each of the TDGEs such that the amount of beam energy extracted from the TDGEs by the main resonator increases approximately in proportion to a decrease in the amount of beam energy extracted from the TDGEs by the helper resonators.

9. The method of claim 8, further comprising:
   out-coupling portions of the respective laser beams of each of the helper resonators with the respective out-coupler optics thereof to produce a plurality of beam portions; and,
   analyzing the respective outcoupled beam portions to provide information on at least one of the performance, health and operational reliability of the respective TDGEs.

10. The method of claim 8, wherein the out-coupler optic of each helper resonator comprises a nearly flat mirror with uniform reflectivity profile.

11. A multidisk unstable imaging thin disk laser (TDL) main resonator, comprising:
   a plurality of laser disk imaging devices, each device comprising a respective one of a plurality of TDGEs disposed in confocal relationship with an associated one of a plurality of corresponding spherical concave relay mirrors, the imaging systems being disposed in cascade along a zigzag-shaped optical axis of the main resonator;
   a spherical concave primary mirror disposed at a first end of the optical axis of the main resonator;
   a spherical concave feedback mirror disposed at an opposite second end of the optical axis of the resonator;
   a plurality of optical light sources for pumping each of the TDGEs with pump light; and,
   a plurality of helper resonators respectively associated with each of the TDGEs of the main resonator.

12. The main resonator of claim 11, wherein each helper resonator comprises:
   an associated one of the TDGEs of the main resonator, the associated TDGE having an axis extending through a center of and disposed normal to a front surface thereof; and,
   a pair of helper reflectors disposed on opposite sides of the associated TDGE and respectively disposed on optical axes that are coplanar with each other and the normal axis of the associated TDGE and that intersect the normal axis of the associated TDGE at the front surface thereof at equal angles.

13. The main resonator of claim 12, wherein at least one of the helper reflectors comprises a partially reflective out-coupler optic.

14. The main resonator of claim 13, wherein at least one of the feedback mirror of the main resonator and the partially reflective out-coupler optic of the main resonator comprises a gradient reflectivity mirror (GRM).

15. The main resonator of claim 11, wherein at least one of the TDGEs comprises ytterbium (Yb) doped yttrium aluminum garnet (YAG) gain media,
the single disk helper resonator is capable of lasing in a multimode regime,
the pump light sources comprise laser diodes.

16. The main resonator of claim 11, wherein the main resonator comprises a negative branch unstable imaging resonator (NBIR).

17. The main resonator of claim 11, further comprising a diagnostics unit coupled to the out-coupler optic of each helper resonator and adapted to provide information on at least one of the performance, health and reliability of the associated TDGE thereof.

18. The main resonator of claim 17, wherein the diagnostics unit comprises optical sensors coupled to the output optic of each helper resonator and operable to measure the laser power pumped into each TGDE, the laser power output from each of the helper resonators, and the laser power output from the main resonator.

19. The main resonator of claim 11, wherein the helper resonators are operable during startup of the main resonator to effect at least one of the group consisting of:

limiting the effects of amplified spontaneous emission (ASE) in a lateral dimension of the TDGEs;
pre-conditioning the TDGEs so as to enable efficient power transfer from the helper resonators to the main resonator when the main resonator reaches a selected feedback ratio (FBR); and,
providing a rapidly acting shunt for disk power in the event of cessation of lasing of the main resonator.

20. A method for starting up the main resonator of claim 11 reliably and controllably, the method comprising:
pumping the respective front surfaces of the TDGEs with pump light such that each of the helper resonators operates predominantly in a multi-mode regime at a relatively large intra-cavity beam intensity and the main resonator operates predominately in a fundamental mode regime at a relatively small intra-cavity beam intensity at low pump intensity levels; and,
increasing the intensity of the pump light to the TDGEs such that the amount of beam energy extracted from the TDGEs by the main resonator increases in proportion to a decrease in the amount of beam energy extracted from the TDGEs by the helper resonators.

* * * * *